United States Patent Office 2,797,216
Patented June 25, 1957

2,797,216

PRODUCTION OF CAPROLACTAM

George M. Wagner, Lewiston, and James B. O'Hara, Kenmore, N. Y., assignors to Olin Mathieson Chemical Corporation, a corporation of Virginia No Drawing. Application August 5, 1954,
Serial No. 448,119

3 Claims. (Cl. 260—239.3)

This invention relates to improvements in the manufacture of caprolactam. More particularly, the invention is concerned with a method of rearranging cyclohexanone oxime hydrochlorides to caprolactam through utilization of concentrated sulfuric acid. In another particular aspect the invention relates to a process for the separation of cyclohexanone oxime as a hydrochloride from either a crude or a relatively pure solution of the oxime in an organic solvent with direct rearragement of the resulting salt to caprolactam under conditions which effect continuous evolution of hydrogen chloride. The evolved hydrogen chloride is suitable to form additional quantities of the hydrochloride.

The rearrangement of cyclohexanone oxime by the Beckmann process utilizing elevated temperatures and concentrated sulfuric acid as the rearrangement medium is well-known. It has now been discovered that the hydrochlorides of cyclohexanone oxime may be rearranged directly to caprolactam by the Beckmann rearrangement process. Under the rearrangement conditions, hydrogen chloride is evolved and is suitable for use in forming additional quantities of the hydrochlorides of cyclohexanone oxime.

Caprolactam can be prepared according to the process of the present invention by rearranging the hydrochloride of cyclohexanone oxime which has been obtained in any suitable manner. For example, cyclohexanone can be converted to the oxime by reaction with hydroxyl amine. The resulting oxime can be dissolved in a suitable organic solvent and treated with hydrogen chloride gas to precipitate a hydrochloride of the oxime. The hydrochloride can also be prepared through the reaction of nitrosyl chloride and cyclohexane under the influence of suitable radiation. A liquid phase insoluble in cyclohexane and rich in cyclohexanone oxime hydrochlorides separates from the mixture. This crude oily hydrochloride phase is suitable for use according to the present invention.

Cyclohexanone oxime is also obtained by the reduction of nitrocyclohexane for example with hydrogen sulfide or other reagents. These reductions are carried out in the presence of organic solvents or alternatively, the oxime is extracted from the reaction medium by means of a water-insoluble organic solvent. The oxime-containing solutions are treated with dry hydrogen chloride gas to form the hydrochlorides which can be employed in the process of the present invention. An advantageous method of carrying out the hydrogen sulfide reduction is described in U. S. patent application of Nicolaisen and O'Hara, Serial No. 448,088, filed August 5, 1954, in which method the aqueous reduction mixture is extracted with a water-immiscible organic solvent immediately following the reduction step to recover the oxime. For this purpose benzene, toluene, hexane, heptane, petroleum ether, and cyclohexane are examples of suitable solvents. These solvents as well as methanol or ethanol can be used as reaction media in the catalytic hydrogenation of nitrocyclohexane to cyclohexanone oxime. The resulting oxime solutions can be treated with dry hydrogen chloride to form hydrochlorides which are suitable for treatment according to the present invention. Any other organic solvent which dissolves cyclohexanone oxime and which does not exert a similar effect on the oxime hydrochloride can be utilized in this process.

Prior methods for rearranging cyclohexanone oxime to caprolactam have usually required that pure oxime be charged to the rearrangement in order to produce caprolactam of satisfactory quality. Ordinarily the oxime must be recovered from the crude reaction mixture of a previous process and purified to be suitable for rearrangement. These purification operations may include, for example, direct crystallization of the oxime from its solution in an organic solvent. This method requires concentration of the oxime solution by distillation. Because of the appreciable amounts of by-products present, the oxime will not usually crystallize readily or in a pure condition. An alternative method for purifying the oxime includes its extraction in the form of its sodium salt from the organic solvent with subsequent acidification of the aqueous extract to precipitate the oxime. In these and other known alternatives for the recovery of cyclohexanone oxime, several operations are required with attendant mechanical losses and economic disadvantages. The products are not necessarily obtained in pure condition.

It has been found that the present invention is not only applicable to the rearrangement of the cyclohexanone oxime hydrochlorides to caprolactam but, in addition, is of particular value in producing caprolactam from crude mixtures of cyclohexanone oxime as derived from the several reactions noted above. In these reactions the crude oxime is obtained in solution in an organic solvent, and a purification of this product is effected through treatment with dry hydrogen chloride. The resulting cyclohexanone oxime hydrochlorides separate from the solvent medium and are suitable for direct charging to the sulfuric acid rearrangement step to obtain caprolactam. Thus this method is particularly advantageous since it avoids the uneconomical and tedious purifications of the oxime before charging to the rearrangement operation as has been experienced in previous processes. In this arrangement of the present invention, the hydrogen chloride which effects the separation and purification of the oxime is evolved from the rearrangement reaction and is recovered in condition suitable for immediate reuse through recycling to the hydrochloride-forming operation. The organic solvent separated from the hydrochlorides formed may be recycled for use in further extractions or formations of the oxime.

In the treatment of either the crude or the relatively pure oxime solutions according to the present process at least about one mole of the hydrogen chloride gas per mole of oxime is introduced into the solution of the oxime in an organic solvent. A solid monohydrochloride is usually the first-formed precipitate. By avoiding an excess of hydrogen chloride of more than one mole per mole of oxime the hydrochloride can be obtained in crystalline condition suitable for filtration. When an excess of hydrogen chloride over this proportion is utilized, a liquid hydrochloride which is insoluble in most organic solvents is formed and can be separated by stratification, centrifuging or other means. This liquid hydrochloride is believed to approximate a dihydrochloride of the oxime. Either the liquid or solid hydrochlorides of cyclohexanone oxime or other separable hydrochloride salts of the oxime are suitable for direct charging to the rearrangement step to produce caprolactam without undergoing an additional purification operation. As noted, evolved anhydrous hydrogen chloride is suitably recycled to the precipitation step and the sulfuric acid rearrangement mixture is treated to recover caprolactam.

The reaction conditions to be observed in the rearrangement operation of the present invention are those which are conventionally employed in the Beckmann rearrangement of cyclohexanone oxime with concentrated sulfuric acid. Thus the sulfuric acid must be in concentrated form and elevated reaction temperatures are utilized. Generally, the sulfuric acid may range from about 75 to 100% strength, based on water and sulfuric acid, while the rearrangement temperature may vary from about 60 to 120° C.

A suitable system for treating crude oxime according to the present invention can include a precipitating vessel to which is charged separately the organic solvent solution of the oxime and the dry hydrogen chloride gas. Advantageously, the contents of the vessel are agitated during treatment with the hydrogen chloride which forms the desired hydrochloride. The slurry of crystalline oxime hydrochloride and solvent or the heterogeneous mixture of organic solvent and the liquid hydrochlorides are separated by appropriate means. In the case of a slurry of solid hydrochloride and organic liquid a filter or centrifuge will ordinarily be employed. When two liquid layers are to be separated the device may be a settler or a liquid-liquid centrifuge. The solvent effluent from the separating device can be recycled for the preparation of additional oxime solution. If desired, the solvent may be purified before recycling. The liquid or solid hydrochloride removed from the separating device can be charged directly, with or without treatment to remove adherent solvent, to the sulfuric acid rearrangement operation. The rearrangement is carried out under elevated temperatures in a vessel containing a body of sulfuric acid of suitable strength. Under the conditions for effecting the rearrangement, hydrogen chloride is evolved from the reaction mixture and is suitably recovered and recycled to the precipitator usually without the necessity for further treatment. The residual solution of caprolactam and sulfuric acid is then treated by suitable means for recovery of the lactam.

In a more elaborate and particularly advantageous system for effecting the process of the present invention, an aqueous reduction liquor, say, from a hydrogen sulfide reduction of nitrocyclohexane, containing cyclohexanone oxime is extracted by means of fresh or recycle hydrocarbon solvent in a suitable extraction device. The extraction may be accomplished by turbulent flow in a pipe line or in an extraction vessel of any suitable design. The heterogeneous mixture of aqueous liquor and solvent containing oxime is charged to a separator suitable for the partition of two immiscible liquids. The extracted aqueous portion is removed and re-extracted with recycle and/or fresh solvent before recycling the aqueous liquor to the reduction operation or discharging it in whole or in part to waste. The extract in the re-extraction hydrocarbon solvent is suitably returned to the principal extraction operation.

The principal extraction hydrocarbon solution of oxime is charged to a precipitating vessel, for example, a kettle fitted with a stirring device. Fresh and recycle hydrogen chloride gas is introduced until solid or liquid oxime hydrochlorides are formed. The mixture is suitably separated, for example, by a filter when the oxime hydrochloride is solid or by a liquid-liquid centrifuge when the salt is a liquid. The solvent from which oxime has been removed is recycled to the extractor or may be charged in whole or in part to a distillation zone for recovery of purified solvent.

The oxime hydrochlorides with or without treatment to remove adherent mother liquor or wash solvent may be charged to a rearrangement vessel together with sulfuric acid in which the rearrangement is carried out. Charging the oxime hydrochloride rather than oxime causes evolution of hydrogen chloride which is advantageously recycled with or without the addition of fresh hydrogen chloride as necessary to the precipitating operation. The rearrangement liquor is treated by any suitable means for the recovery of the lactam.

The process of the present invention may be carried out batchwise or continuously. In a continuous process, cyclohexanone oxime is supplied continuously from a suitable source in the form of a pure solid, a suitable solution, for example, in cyclohexane, or a crude extract of a hydrogen sulfide reduction of nitrocyclohexane. Anhydrous hydrogen chloride is supplied in suitable proportions and the solid or liquid hydrochlorides are continuously separated, recycling the solvent. The separated hydrochlorides are charged with sulfuric acid to a continuous rearranger from which hydrogen chloride is continuously evolved and recycled to the hydrochloride-forming step. Caprolactam is continuously recovered from the sulfuric acid solution. Alternatively the continuous process may be modified and carried out partially or completely batchwise. For example, only the recovery of caprolactam may be batchwise while the other operations are continuous. When all the operations are batchwise, it may be preferable to use fresh hydrogen chloride for the precipitation step, discarding the hydrogen chloride evolved from the rearrangement step, particularly when these are not carried out simultaneously.

The following examples illustrate the present invention but are not to be considered limiting:

*Example I*

A solution of 120 grams of nitrosyl chloride in 5 liters of cyclohexane was irradiated by means of a mercury vapor lamp for 1.5 hours while the reaction mixture was maintained below 30° C. by circulating ice water in a jacket surrounding the liquid. The solution was drained from the reactor and the insoluble oil was separated from the cyclohexane. The oil was warmed in a vacuum to remove cyclohexane and some hydrogen chloride. A portion was treated with caustic and extracted with ether. On evaporation of the extract 56% of the oil charged was obtained as oxime (in the extraction some losses occurred). A 40 gram portion of the oil was added dropwise during a period of 20 minutes to 120 grams of concentrated sulfuric acid at about 85° to 95° C. Hydrogen chloride was evolved. Heating was continued at the same temperature for one hour. The reaction mixture was neutralized by adding it to 210 grams of 28% aqueous ammonia. It was then extracted three times with benzene. The extracts were combined, filtered and evaporated. The residue was vacuum distilled and caprolactam was obtained as a product boiling at 132° C. at 8 mm. The yield based on an oxime content of 56% in the oil charged was 71%.

*Example II*

Cyclohexanone oxime hydrochlorides were prepared by dissolving 199 grams of crude cyclohexanone oxime in 3400 grams of cyclohexane and introducing dry hydrogen chloride gas until the solid first precipitated was converted to an oil insoluble in the cyclohexane. The temperature was kept below 30° C. The viscous, oily hydrochloride, amounting to 304 grams, was separated and blown with air removing some hydrogen chloride. The residual oil contained 32.05% of hydrogen chloride compared with a theoretical value for a cyclohexanone oxime dihydrochloride of 39.0%.

The oily oxime hydrochloride was then rearranged by adding dropwise 160 grams, equivalent to about 100 grams of oxime, to concentrated sulfuric acid maintained at 100° C. Hydrogen chloride was evolved. The addition required 30 minutes and the mixture was stirred at this temperature for another 30 minutes. The reaction mixture was neutralized, extracted and distilled as described in Example I. Caprolactam was obtained as a pure white solid in a yield of 84% of the theory.

Example III

Cyclohexanone oxime monohydrochloride was prepared by dissolving 86 grams of crude cyclohexanone oxime in 2500 ml. of cyclohexane and introducing dry hydrogen chloride gas at the rate of 4 grams per minute for 17 minutes at a temperature of 28 to 45° C. The mixture was cooled in ice, filtered and the crystals were freed of solvent in a vacuum. Addition of a sample to water and titration of the acid with standard caustic showed 23.55% of hydrogen chloride compared with a theoretical value of 24.48% for a monohydrochloride.

The monohydrochloride, added in small portions to a body of 95% sulfuric acid maintained at 100° C. is rearranged to caprolactam and the caprolactam is recovered as described in the preceding examples. The anhydrous hydrogen chloride evolved is suitably reintroduced into additional quantities of cyclohexanone oxime dissolved in cyclohexane for the prepartion of additional quantities of cyclohexanone oxime hydrochloride.

Example IV

A solution of 4.5% of cyclohexanone oxime in cyclohexane was obtained by the hydrogen sulfide reduction of the aqueous sodium salt of nitrocyclohexane in dilute sulfuric acid solution and extraction of reaction mixture with cyclohexane. Hydrogen chloride gas was passed into the cyclohexane solution of cyclohexanone oxime at about 40° C. until the solid initially precipitated was converted to an oil. The oil was separated and a portion was neutralized with an aqueous caustic. The precipitated oxime was filtered, dried and weighed. By this analysis, the oil contained about 70% of oxime.

The above oxime hydrochloride was added in small portions to 700 grams of 95% sulfuric acid and maintained at 100° C., until a total of 600 grams of the salt had been added. After the final addition the temperature was maintained for an additional 0.5 hour. The reaction mixture was neutralized, extracted and the extract distilled as described in Example I to recover the caprolactam.

We claim:

1. A method for producing caprolactam which comprises contacting a solution of cyclohexanone oxime in cyclohexane with dry hydrogen chloride, to form an insoluble cyclohexanone oxime hydrochloride, separating the hydrochloride from the cyclohexane phase, contacting the hydrochloride with sulfuric acid of about 75 to 100% strength while maintaining the temperature of the resulting mixture from about 60° to 120° C. to effect rearrangement of the hydrochloride to caprolactam, evolving hydrogen chloride from the rearranging mixture, and recovering caprolactam.

2. A method for producing caprolactam which comprises contacting a solution of crude cyclohexanone oxime in cyclohexane with dry hydrogen chloride to form an insoluble cyclohexanone oxime hydrochloride, separating the hydrochloride from the cyclohexane phase, contacting the hydrochloride with sulfuric acid of about 75 to 100% strength while maintaining the temperature of the resulting mixture from about 60° to 120° C. to effect rearrangement of the hydrochloride to caprolactam while continuously evolving hydrogen chloride from the rearranging mixture and recovering the caprolactam.

3. A continuous method according to claim 2 in which the hydrogen chloride evolved is contacted with further quantities of crude cyclohexanone oxime in cyclohexane.

References Cited in the file of this patent

UNITED STATES PATENTS

| | | |
|---|---|---|
| 2,221,369 | Cass | Nov. 12, 1940 |
| 2,313,026 | Schlack | Mar. 2, 1943 |
| 2,712,032 | Von Schickh | June 28, 1955 |

FOREIGN PATENTS

| | | |
|---|---|---|
| 577,696 | Great Britain | May 28, 1946 |
| 857,714 | France | Sept. 26, 1940 |